United States Patent
Mulhaupt et al.

(10) Patent No.: US 11,401,479 B2
(45) Date of Patent: *Aug. 2, 2022

(54) METHOD FOR PRODUCING A PARTICULATE CARRIER MATERIAL, WHICH IS SHEATHED IN A GRAPHENE-CONTAINING MATERIAL, AND A SLIDE ELEMENT, AND SLIDE ELEMENT, SLIP RING SEAL AND BEARING ARRANGEMENT

(71) Applicant: EagleBurgmann Germany GmbH & Co. KG, Wolfratshausen (DE)

(72) Inventors: Rolf Mulhaupt, Freiberg (DE); Jorg Thomas Thelke, Wolfratshausen (DE); Wenli Zhang, Freiberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 203 days.

This patent is subject to a terminal disclaimer.

(21) Appl. No.: 16/628,587

(22) PCT Filed: Jul. 5, 2018

(86) PCT No.: PCT/EP2018/068191
§ 371 (c)(1),
(2) Date: Jan. 3, 2020

(87) PCT Pub. No.: WO2019/008079
PCT Pub. Date: Jan. 10, 2019

(65) Prior Publication Data
US 2020/0157452 A1    May 21, 2020

(30) Foreign Application Priority Data
Jul. 7, 2017 (DE) .................... 10 2017 211 660.9

(51) Int. Cl.
*C10M 103/02* (2006.01)
*C04B 41/00* (2006.01)
(Continued)

(52) U.S. Cl.
CPC ......... *C10M 103/02* (2013.01); *C04B 41/009* (2013.01); *C04B 41/5001* (2013.01);
(Continued)

(58) Field of Classification Search
CPC ... C04B 41/009; C04B 41/5001; C04B 41/87; C04B 2235/3206; C04B 2235/3217;
(Continued)

(56) References Cited

U.S. PATENT DOCUMENTS

2015/0125533 A1* 5/2015 Sallam ............... A61K 41/0052
424/490
2015/0148459 A1* 5/2015 Pawloski ............... C08K 3/042
524/35
2017/0321057 A1* 11/2017 Rueger ................ C09D 11/037

FOREIGN PATENT DOCUMENTS

CN    106128562 A    11/2016
CN    106388349 A    2/2017
(Continued)

OTHER PUBLICATIONS

International Search Report issued in PCT/EP2018/068191, dated Dec. 17, 2018.

*Primary Examiner* — James C Goloboy
(74) *Attorney, Agent, or Firm* — Locke Lord LLP; Scott D. Wofsy

(57) ABSTRACT

The invention relates to a sliding member having a first sliding surface, wherein the first sliding surface (29) comprises a particulate support material (6) and a graphene-containing material (7), wherein the particulate support material (6) is at least partially coated with the graphene-
(Continued)

containing material (7), and wherein a material bond (14) is present between the particulate support material (6) and the graphene-containing material (7).

13 Claims, 5 Drawing Sheets

(51) Int. Cl.
*C04B 41/50* (2006.01)
*C04B 41/87* (2006.01)
*F16C 33/16* (2006.01)
*F16J 15/34* (2006.01)
*C10N 50/00* (2006.01)
*C10N 40/02* (2006.01)

(52) U.S. Cl.
CPC ............. *C04B 41/87* (2013.01); *F16C 33/16* (2013.01); *F16J 15/3496* (2013.01); *C04B 2235/3206* (2013.01); *C04B 2235/3217* (2013.01); *C04B 2235/3244* (2013.01); *C04B 2235/386* (2013.01); *C04B 2235/3821* (2013.01); *C04B 2235/3826* (2013.01); *C04B 2235/3847* (2013.01); *C04B 2235/3873* (2013.01); *C10M 2201/0413* (2013.01); *C10N 2040/02* (2013.01); *C10N 2050/023* (2020.05)

(58) Field of Classification Search
CPC .... C04B 2235/3244; C04B 2235/3821; C04B 2235/3826; C04B 2235/3847; C04B 2235/386; C04B 2235/3873; C10M 103/02; C10M 2201/0413; C10N 2040/02; C10N 2050/023; F16C 33/16; F16J 15/3496

See application file for complete search history.

(56) References Cited

FOREIGN PATENT DOCUMENTS

| | | | |
|---|---|---|---|
| CN | 106761100 A | 5/2017 | |
| EP | 3119732 A1 | 1/2017 | |
| WO | WO-2016091355 A1 * | 6/2016 | ............... B05D 7/24 |
| WO | 2017206645 A1 | 12/2017 | |

* cited by examiner

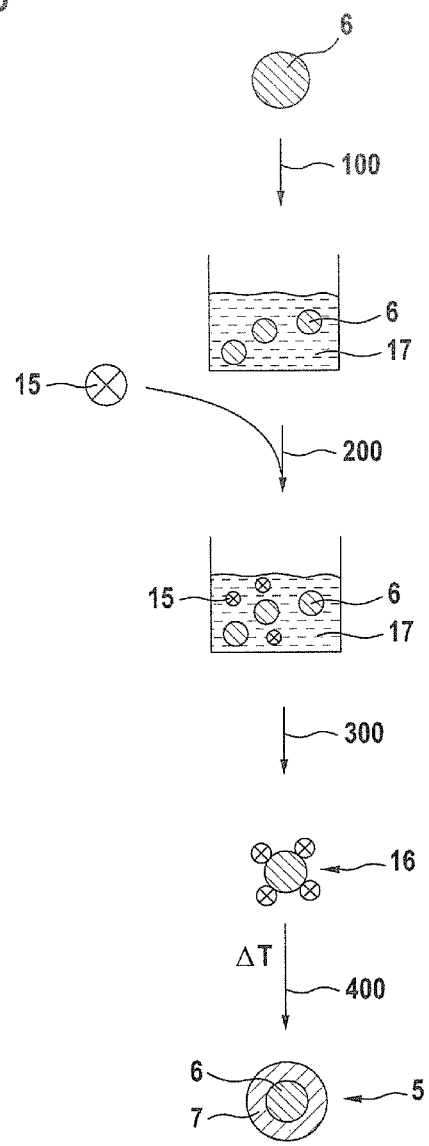

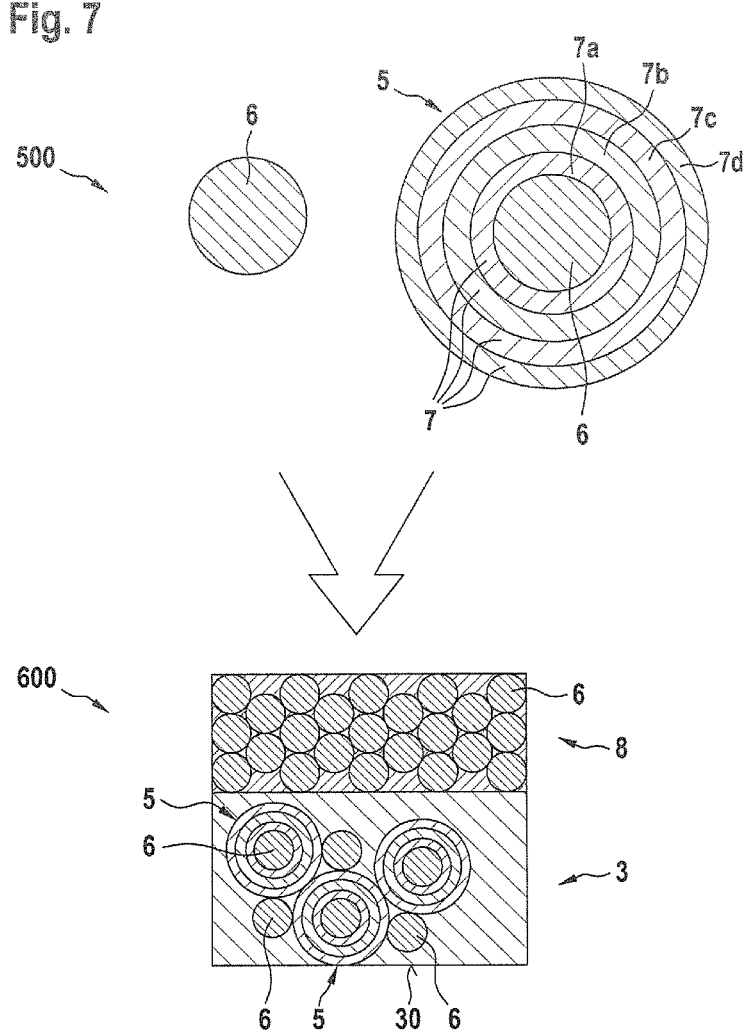

METHOD FOR PRODUCING A PARTICULATE CARRIER MATERIAL, WHICH IS SHEATHED IN A GRAPHENE-CONTAINING MATERIAL, AND A SLIDE ELEMENT, AND SLIDE ELEMENT, SLIP RING SEAL AND BEARING ARRANGEMENT

CROSS REFERENCE TO RELATED APPLICATIONS

This application is a U.S. National Phase Application filed under 35 U.S.C. § 371, based on International PCT Patent Application No. PCT/EP2018/068191, filed Jul. 5, 2018, which application claims priority to German Patent Application No. 10 2017 211 660.9 filed on Jul. 7, 2017. The entire contents of these applications is incorporated herein by reference in their entireties.

The invention relates to a method for the manufacture of a particulate support material coated with a graphene-containing material and a method for the manufacture of a sliding member. Moreover, the invention also relates to a sliding member having excellent stability and low abrasion, as well as a mechanical seal and a bearing arrangement comprising said sliding member.

From prior art, e.g. DE 10 2014 205 291 A1, a mechanical seal is known, which contains SiC as base material supplemented with graphene as a filler. The mechanical seal is characterized by good fracture toughness and flexural strength. The disadvantages thereof are comparatively low hardness and low modulus of elasticity. This reduces abrasion resistance, making the mechanical seal less suitable for use in mechanically and/or thermally impacted systems.

Therefore, it is the object of the invention to provide a sliding member, a mechanical seal and a bearing arrangement which are characterized by improved abrasion resistance and hardness, and hence increased stability even under high mechanical and/or thermal impacts. Furthermore, it is an object of the invention to provide a method for the manufacture of a particulate support material coated with a graphene-containing material, as well as a method for the manufacture of a sliding member, which methods are characterized by simple feasibility, wherein in the former method the particulate support material coated with graphene-containing material will be obtained in high yield.

This object will be achieved by a sliding member according to claim 1. The sliding member of the invention comprises a first sliding surface which is or may be brought into a sliding contact with another component.

Herein, the first sliding surface comprises a particulate support material and a material containing graphene.

By particulate support material a material is meant that serves as a substrate, i.e. as a base material, for the application of graphene-containing material. The particulate support material is in the form of particles which at least partially, and especially completely, are coated with the graphene-containing material.

Within the scope of the present invention, by graphene-containing material a material is understood, consisting, at least partially, of graphene. Preferably, the entire graphene material consists of graphene, except for technically unavoidable residues.

A material bond is present between the particulate support material and the graphene-containing material. This means that a bond is established between the particulate support material and the graphene-containing material wherein the graphene-containing material directly adheres to the surface of the particulate support material. The material bond may be characterized by physical and/or chemical interactions between the particulate support material and the graphene-containing material. Interconnections between graphene and the particulate support material may also be involved in formation of the bond. The material bond between the graphene and the particulate support material provides for permanently good, abrasion-resistant coating with graphene-containing material being present on the top surface of the particulate support material.

Thus, the sliding member is characterized by high hardness and a high modulus of elasticity, even at high mechanical impacts and high temperatures, which ensures high abrasion resistance of the sliding member and, at the same time, good sliding properties.

Advantageous embodiments and further developments of the invention are the subject matter of the subclaims.

According to an advantageous further development, the particulate support material is completely coated with the graphene-containing material. This means that the particle surface of the particulate support material is throughout coated with the graphene-containing material. This may improve abrasion resistance of the sliding member while maximizing the modulus of elasticity.

Still advantageously, the sliding member includes a first base body. The base body is to be regarded as a bottom body onto or at which an appropriate sliding surface will be applied or formed, respectively. To improve bonding between the base body and the sliding surface, the first base body exclusively comprises the particulate support material. In other words, this means that the first base body is made of the same particulate support material as the particulate support material coated with graphene-containing material, but which, unlike the particulate support material contained in the first sliding surface, is not coated with graphene-containing material.

For the sake of improved sliding properties and good stability, the entire first sliding surface is preferably formed of the support material coated with the graphene-containing material, or further advantageously, the entire sliding member is formed of support material coated with graphene-containing material, respectively. This may also reduce or even prevent formation of cracks in the graphene-containing material.

For the sake of cost reduction while maintaining good hardness of the sliding surface and/or the sliding member, it is advantageously provided for the first sliding surface to consist of a mixture of particulate support material and particulate support material coated with graphene-containing material.

Still advantageously, a mass ratio of particulate support material and particulate support material coated with graphene-containing material is 80:20 to 99.5:0.5 and in particular of 90:10 to 99.5:0.5. While graphene feedstock being low, very good abrasion resistance may still be obtained for a first sliding surface. Thus, the sliding member may be manufactured at low cost.

To further improve abrasion resistance of the first sliding surface by increasing hardness thereof, a ceramic material will preferably be used as the particulate support material. It has been proven, that ceramic materials, i.e. fired ceramics, are particularly resistant to abrasion even under severe conditions, such as high mechanical and/or thermal impact. Advantageously, the ceramic material will be selected from the group consisting of: SiC, WC, $B_4C$, BN, $Si_3N_4$, $Al_2O_3$, MgO, $ZrO_2$ and any mixtures thereof, wherein SiC is particularly preferred for the reasons of cost.

In view of further improving abrasion resistance of the first sliding surface of the sliding member, it is also advantageously provided for the graphene-containing coating to comprise one layer up to 100 layers, in particular one layer up to 20 layers and in particular one layer up to twelve layers of graphene-containing material. The layer structure also allows the tribological properties of the sliding member to be optimized.

Significant reduction of the potential wear volume of the first sliding surface may be achieved by the advantageous further development, wherein the first sliding surface contains 6 to 8% macropores by volume, related to the total volume of the first sliding surface. In this context, macropores are pores having a pore diameter of 10 to 50 µm in the sense of the present invention. The pore diameter is determined by an LSM method (Laser-Scanning-Microscopy). Preferably, the first sliding surface is free of micropores, having a pore diameter of 1 to 10 µm. Free of pores means that there are no micropores between the particulate support material coated with graphene-containing material and any non-coated particulate support material. Thus, density of the first sliding surface is optimal, whereby abrasion resistance may also be increased while maintaining good sliding properties.

Furthermore, according to the invention, a mechanical seal is also described. The mechanical seal according to the invention comprises a rotating first seal ring with a first sliding surface and a stationary second seal ring with a second sliding surface, which define a sealing gap therebetween. In the mechanical seal according to the invention, the first seal ring or the second seal ring or, in particular, both seal rings are designed in the shape of the sliding member according to the invention, as described above. By forming one or even both seal rings of the mechanical seal in the shape of the gliding element according to the invention, high hardness and high modulus of elasticity may also be achieved in the mechanical seal according to the invention, even under high mechanical impact and high temperatures, thereby obtaining high abrasion resistance of the first and/or second seal ring while at the same time maintaining good sliding properties.

In addition, a bearing arrangement comprising at least one sliding member as disclosed above is also described according to the invention. The bearing arrangement may, for example, be in the form of a slide bearing or a rolling bearing. The design of a slide bearing is especially preferred, which in particular is a radial slide bearing or an axial slide bearing. One or both sliding members or one or both sliding surfaces of the sliding bearing are preferably designed according to a sliding member according to the invention. Such bearing arrangements are preferably used for pumps or magnetic couplings.

The bearing arrangement preferably comprises at least one outer raceway and one inner raceway, the rolling bearing additionally comprising rolling members. According to the invention, the outer raceway or the inner raceway or both raceways are designed in the form of the sliding member according to the invention, as disclosed above. If the bearing arrangement is a rolling bearing, one or more rolling members in the form of the sliding member according to the invention may be designed alternatively or in addition thereto. This allows very good abrasion resistance of the bearing arrangement to be achieved even at high temperatures and high mechanical impacts while providing very good sliding properties.

Still according to the invention, a method for the manufacture of a particulate support material coated with a graphene-containing material will be described. Due to its very good mechanical properties, the support material manufactured may especially be used to improve abrasion resistance of a sliding member, such as the sliding surface of a seal ring or bearing arrangement.

The method first comprises a step of dispersing a particulate support material in a dispersant. Neither the particulate support material nor the dispersant are limited in detail. Especially, the particulate support material may be formed as mentioned above in relation to the sliding member according to the invention, and advantageously may comprise at least one ceramic material, and especially SiC for this purpose. As a dispersant, a medium is chosen in which the particulate support material may easily be distributed. For cost and environmental reasons, aqueous and/or alcoholic dispersants, and in particular ethanol-containing dispersants, are preferred. Dispersing may be carried out, for example, using ultrasound and/or a stirrer and/or homogenizer. Good distribution of the particles of the particulate support material in the dispersant is essential.

In another step, addition of a carbon source is performed, especially a carbonaceous compound. This compound is suitable to produce graphene-containing material when appropriately processed. In other words, the carbon source is a graphene precursor.

Subsequently, the dispersant will be removed while obtaining a solid substance. Common process steps may herein be applied, such as removal of the dispersant by temperature application, evaporation of the dispersant in a rotary evaporator or freeze drying. A solid substance will remain from the carbon source for the graphene-containing material to be formed and the particulate support material, wherein the carbon source is arranged on top of the particulate support material.

This is followed by a step of carbonizing the chemical compound. Carbonization is performed under temperature treatment such that graphene-containing material at least partially, and especially completely, covers the particulate support material. The thermal treatment required for this may be performed in a tube furnace, the temperature of which can easily be controlled.

Direct carbonization of graphene precursor arranged on a surface of the particulate support material produces a material bond between the support material and the graphene manufactured. The graphene-containing coating is thus permanently bonded to the particulate support material in a strong and stable manner, resulting in high abrasion resistance. The method is easy to perform, enabling manufacture of high yield particulate support material coated with graphene-containing material.

For environmental reasons and also as this carbon source is derived from renewable feedstock materials, the carbon source advantageously is selected from the group consisting of: Furfuryl alcohol, glucose and any mixtures thereof. Moreover, these compounds easily form high yield of graphene under thermal treatment.

To increase yield of particulate support material coated with graphene-containing material, the solid substance obtained after removal of the dispersant is preferably comminuted before carbonization. Following comminution, the solid substance has a particle diameter of less than 1 mm and in particular less than 0.1 mm. Thus, temperature treatment may also be performed uniformly, while a graphene-containing coating layer is being formed.

A temperature process comprising at least two steps has been proven to be particularly advantageous for the formation of a graphene-containing coating of a particulate support material. Carbonization is especially carried out in a two-step temperature process under inert gas atmosphere, wherein in a first temperature step the solid substance is heated at 80 to 180° C. using a heating rate of 5° C./min and maintained at that temperature range for 15 to 25 hours, and in a second temperature step the solid substance is heated to 600 to 1500° C. using a heating rate of 5° C./min and is maintained at that temperature range for 4 to 8 hours. This allows almost complete conversion of the graphene precursor into graphene, so that the coating layer surrounding the particulate support material largely consists of graphene, with the exception of technically unavoidable residues.

In the following, advantageous further developments for the manufacture of particulate support material coated with graphene-containing material will be disclosed.

For the manufacture of graphene-coated SiC using furfuryl alcohol (FA) (SiC:furfuryl alcohol 90:10 wt. %) SiC (152.55 g) is dispersed in water (200 mL). Furfuryl alcohol (15 mL) is then added. After 10 min of stirring, p-TsOH (0.33 g), as an initiator, is dissolved in water (10 mL) and added to the mixture of SiC/FA. After stirring for another 20 min, the reaction mixture is heated to 80° C. The mixture is then added to the SiC/FA mixture. After 1 h, the mixture is held at 100° C. for another 6 h until the water has evaporated. Following comminution, the dried powder is carbonized (thermolyzed) in a tube furnace in an inert atmosphere ($N_2$). This is done by heating to 150° C. in steps of 5° C./min, holding for 21 h, then increasing to 800° C. in steps of 5° C./min and thermolyzing for 6 h. Herein, the functionalized graphene is produced with furfuryl alcohol as the carbon source in a template-mediated reaction, wherein SiC serves as a template. A homogeneous mixture of graphene and SiC is also obtained. Graphene coating strongly changes the specific surface (from 10 to 39 $m^2/g$), as measured by $N_2$ adsorption using a BET method with a Sorptomatic 1990 (Protec Hofheim) to determine the mass-related specific surface area of a sample by detecting the amount of nitrogen adsorbed onto the sample surface, as well as the color of the SiC.

The morphology of the SiC particles and the graphene-coated SiC may be analyzed by TEM. Thin graphene layers will be obtained. The SiC particles are coated with approx. eight graphene layers. The graphene content of the resulting product is 4.4% by weight.

Alternatively, SiC (90.40 g) is dispersed in ethanol (200 mL) using furfuryl alcohol (SiC:furfuryl alcohol=80:20% by weight) for the manufacture of graphene-coated SiC. Furfuryl alcohol (20 mL) is then added. After 10 min of stirring, p-TsOH (0.44 g) as the initiator is dissolved in ethanol (10 ml) and is added to the SiC/FA mixture. After stirring for another 20 min, the reaction mixture is heated to 70° C. The mixture is then added to the SiC/FA mixture. After 3 h, the mixture is held at 100° C. for another 2 h. Removal of the remaining ethanol is done using a rotary evaporator. Following comminution, the dried powder is carbonized in a tube furnace in an inert atmosphere ($N_2$). This is done by heating in steps of 5° C./min up to 150° C., holding for 21 h, then increasing to 800° C. in steps of 5° C./min and thermolyzing for 6 h. The powder is then carbonized in a tube furnace in an inert atmosphere ($N_2$). The product obtained has a graphene content of 7.6% by weight and a specific surface area of 53 $m^2/g$, as measured by $N_2$ adsorption using a BET method with a Sorptomatic 1990 (Protec Hofheim) to determine the mass-related specific surface area of a sample by detecting the amount of nitrogen adsorbed onto the sample surface.

Alternatively, SiC (105.47 g) is dispersed in ethanol (200 mL) using furfuryl alcohol (SiC:furfuryl alcohol=70:30% by weight) for the manufacture of graphene-coated SiC, followed by addition of furfuryl alcohol (40 mL). After 10 min of stirring, p-TsOH (0.88 g), as an initiator, is dissolved in ethanol (10 mL) and added to the SiC/FA mixture. After stirring for another 20 minutes, the reaction mixture is heated to 70° C. The mixture is then added to the SiC/FA mixture. After 4 h, the mixture is held at 100° C. for another 2 h. The remaining ethanol is removed using a rotary evaporator. Following comminution, the dried powder is carbonized in a tube furnace in an inert atmosphere ($N_2$). This is done by heating in steps of 5° C./min up to 150° C., holding for 21 h, then increasing to 800° C. in steps of 5° C./min and thermolyzing for 6 h. The powder is then carbonized in a tube furnace in an inert atmosphere ($N_2$). The product obtained has a graphene content of 14.3% by weight and a specific surface area of 100 $m^2/g$, as measured by $N_2$ adsorption using a BET method with a Sorptomatic 1990 (Protec Hofheim) to determine the mass-related specific surface area of a sample by detecting the amount of nitrogen adsorbed onto the sample surface.

For the manufacture of graphene-coated SiC using glucose (SiC:glucose=90:10% by weight), SiC (20 g) is dispersed in water (90 mL) by means of an ultrasonic bath (2*15 min). A solution of glucose (2.00 g) in water (10 mL) is then added. Following predispersion by means of an ultrasonic bath (2*15 min), the reaction mixture is completely dispersed by means of an ultrasonic lance (2-8 min, 40% amplitude) under ice cooling. The water is then removed by freeze-drying. Following comminution, the dried powder is carbonized in a tube furnace in an inert atmosphere ($N_2$). This is done by heating in steps of 5° C./min up to 150° C., holding for 21 h, then increasing in steps of 5° C./min to 800° C. and thermolyzing for 6 h. The powder is then carbonized in a tube furnace in an inert atmosphere ($N_2$). Herein, instead of using furfuryl alcohol, the functionalized graphene is produced using glucose as a carbon source in a template-mediated reaction, wherein SiC serves as a template. A homogeneous mixture of graphene and SiC is also obtained. Graphene coating strongly changes the specific surface, as measured by $N_2$ adsorption using a BET method with a Sorptomatic 1990 (Protec Hofheim) to determine the mass-related specific surface of a sample by detecting the amount of nitrogen adsorbed onto the sample surface, (from 10 to 20 $m^2/g$), as well as the color of the SiC.

The morphology of the obtained product may be analyzed by TEM. All SiC particles have about seven to 20 graphene layers. The graphene content of the product is 2.0% by weight.

Alternatively, for the manufacture of graphene-coated SiC using glucose (SiC:glucose=80:20 wt. %), SiC (30 g) is dispersed in water (70 mL) by means of an ultrasonic bath (2*15 min). Subsequently, a solution of glucose (7.50 g) in water (30 mL) is added. Following predispersion by means of an ultrasonic bath (2*15 min), the reaction mixture is completely dispersed by means of an ultrasonic lance (2*8 min, 40% amplitude) under ice cooling. The water is then removed by freeze-drying. Following comminution, the dried powder is carbonized in a tube furnace in an inert atmosphere ($N_2$). This is done by heating in steps of 5° C./min to 150° C., it is held for 21 h, then increased in steps of 5° C./min to 800° C. and thermolyzed for 6 h.

The product has a graphene content of 5.2% by weight and a specific surface area of 39 $m^2/g$, as measured by $N_2$ adsorption using a BET method with a Sorptomatic 1990 (Protec Hofheim) to determine the mass-related specific surface area of a sample by detecting the amount of nitrogen adsorbed onto the sample surface.

Alternatively, for the manufacture of graphene-coated SiC using glucose (SiC:glucose=70:30% by weight) SiC (30 g) is dispersed in water (70 mL) by means of an ultrasonic bath (2*15 min). Subsequently, a solution of glucose (12.86 g) in water (30 mL) is added. Following predispersion by means of an ultrasonic bath (2*15 min), the reaction mixture is completely dispersed by means of an ultrasonic lance (2*8 min, 40% amplitude) under ice cooling. The water is then removed by freeze drying. Following comminution, the dried powder is carbonized in a tube furnace in an inert atmosphere ($N_2$). This is done by heating in steps of 5° C./min up to 150° C., holding for 21 h, then increasing to 800° C. in steps of 5° C./min and thermolyzing for 6 h.

The product has a graphene content of 8.8% by weight and a specific surface area of 57 $m^2$/g, as measured by $N_2$ adsorption using a BET method with a Sorptomatic 1990 (Protec Hofheim) to determine the mass-related specific surface area of a sample by detecting the amount of nitrogen adsorbed onto the sample surface.

Alternatively, for the production of graphene coated SiC using glucose (SiC:glucose=60:40% by weight) SiC (30 g) is dispersed in water (70 mL) by means of an ultrasonic bath (2*15 min). A solution of glucose (20.00 g) in water (30 mL) is then added. Following predispersion by means of an ultrasonic bath (2*15 min), the reaction mixture is completely dispersed by means of an ultrasonic probe (2*8 min, 40% amplitude) under ice cooling. The water is then removed by freeze-drying. After comminution, the dried powder is carbonized in a tube furnace in an inert atmosphere ($N_2$). This is done by heating in steps of 5° C./min up to 150° C., heating for 21 h, then increasing to 800° C. in steps of 5° C./min and thermolyzing for 6 h.

The product has a graphene content of 13.4% by weight and a specific surface area of 76 $m^2$/g, as measured by $N_2$ adsorption using a BET method with a Sorptomatic 1990 (Protec Hofheim) to determine the mass-related specific surface area of a sample by detecting the amount of nitrogen adsorbed onto the sample surface.

Furthermore, according to the invention, a method for the manufacture of a sliding member is also described. The method thus is also applicable for the manufacture of a bearing arrangement and a slide ring, as used in the mechanical seal described above. Therefore, additional reference is made to the sliding member according to the invention, as set forth above, with regard to the advantages, advantageous effects and further developments.

In the process according to the invention, a sliding member is manufactured which comprises a sliding surface, which is specifically designed. For this, a mixture is produced in one step which comprises a particulate support material and a particulate support material at least partially, especially completely coated with a graphene-containing material. The particulate support material coated with a graphene-containing material is obtainable, for example, by the process described above for the manufacture of a particulate support material coated with a graphene-containing material. Mixing can be performed in a conventional manner, for example using a stirrer and/or homogenizer and/or ultrasound.

The mixture itself may be formed as a sliding member, but may as well be applied, for example, to a base body especially consisting of the particulate support material, then only forming a sliding surface of the sliding member.

In another step, a sintering procedure of the mixture is added, creating a material bond, a sinter bond between the particulate support material and the support material coated with graphene-containing material. Specifically, a pore-free sliding surface is produced in the sintering procedure. A sliding member produced by the method according to the invention is characterized by high stability and abrasion resistance, even under high mechanical and/or thermal impacts, in a simple and thus also cost-effective manufacturing process.

For the sake of improving hardness of the sliding surface, the particulate support material is advantageously selected from ceramic material, especially among the group consisting of: SiC, WC, $B_4C$, BN, $Si_3N_4$, $Al_2O_3$, MgO, $ZrO_2$ and any mixtures thereof, and especially consisting of SiC.

For further cost reduction while maintaining high stability in the sliding member, the mixture is applied to a base body, the base body especially consisting of a ceramic material, especially selected from the group consisting of: SiC, WC, $B_4C$, BN, $Si_3N_4$, $Al_2O_3$, MgO, $ZrO_2$ and any mixtures thereof, and especially SiC.

In the following, preferred example embodiments of the invention will be described in detail while making reference to the accompanying drawing. In the drawing, equal or functionally equal parts are identified with the same reference numbers, wherein:

FIG. 6 is a schematic representation of a method for the manufacture of particulate support material coated with graphene-containing material according to an embodiment of the invention;

FIG. 7 is a schematic representation of a method for the manufacture of a sliding member according to an embodiment of the invention.

The present invention is described in detail by example embodiments. The figures only show the essential features of the present invention, all other features are omitted for the sake of clarity. Furthermore, equal reference numbers identify equal members.

Figure 1:
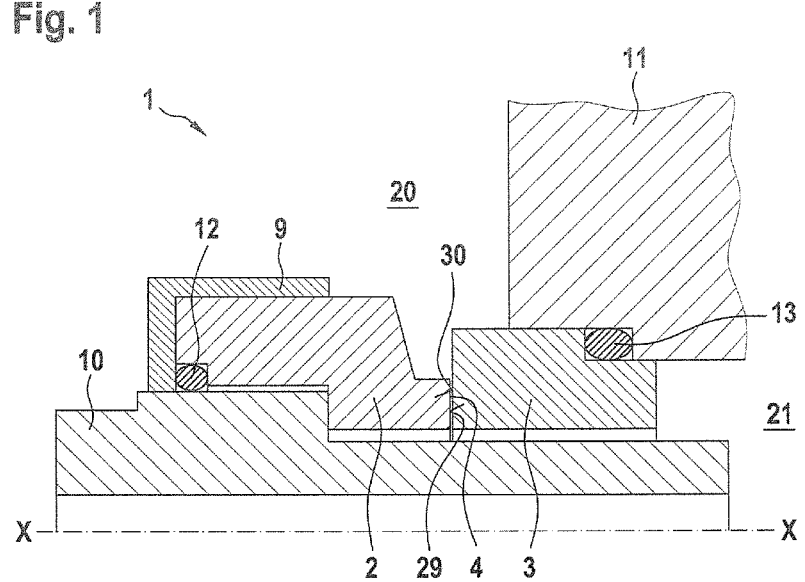
FIG. 1 is a schematic sectional view of a mechanical seal according to a first example embodiment of the invention.

FIG. 1 schematically shows a mechanical seal arrangement 1 comprising a rotating slide ring 2 having a first sliding surface 29, and a stationary slide ring 3 having a second sliding surface 30. A sealing gap 4 is defined between the two slide rings 2, 3 in a known manner. The rotating seal ring 2 is connected to a rotating component 10, such as a shaft sleeve or the like, via a driving member 9. The reference numbers 12 and 13 identify O-rings. The stationary seal ring 3 is connected to a stationary component 11, such as a housing or the like.

The mechanical seal arrangement 1 seals a product area 20 from an atmosphere area 21.

Figure 2:
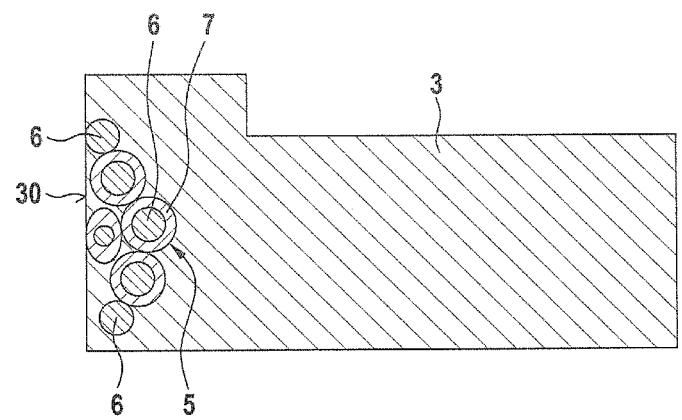
FIG. 2 is a schematic sectional view of the second slide ring shown in FIG. 1.

Within the scope of the invention, the stationary slide ring 3 is to be regarded as a sliding member and is shown in detail in FIG. 2. The stationary slide ring 3 includes the second sliding surface 30. The second sliding surface 30 is made of a sintered material comprising a particulate support material 6 and a graphene containing material 7. The particulate support material 6 is at least partially coated with the graphene-containing material 7, such that the graphene-containing material 7 at least sectionally surrounds a surface of the particulate support material 6. In FIG. 2, the graphene-containing material 7 is exemplified as completely surrounding the particulate support material 6, but this is not essential.

As it may also be seen in FIG. 2, the second sliding surface 30 not only comprises a support material 5 coated with graphene-containing material, but also comprises particulate support material 6 not coated with graphene-containing material. In other words, the second sliding surface 30 comprises a mixture of particulate support material 6 and particulate support material 5 coated with graphene-containing material.

Herein, a mass ratio of particulate support material 6 and particulate support material 5 coated with graphene-containing material advantageously is 80:20 to 99.5:0.5 and especially 90:10 to 99.5:0.5.

In the embodiment shown, the particulate support material 6 consists of a ceramic material, especially selected from the group consisting of: SiC, WC, $B_4C$, BN, $Si_3N_4$, $Al_2O_3$, MgO, $ZrO_2$ and any mixtures thereof. SiC is particularly preferred because of good processability, excellent mechanical properties and also because of reasonable price thereof. The particulate support material 6 is in the form of ceramic grains.

Figure 5:
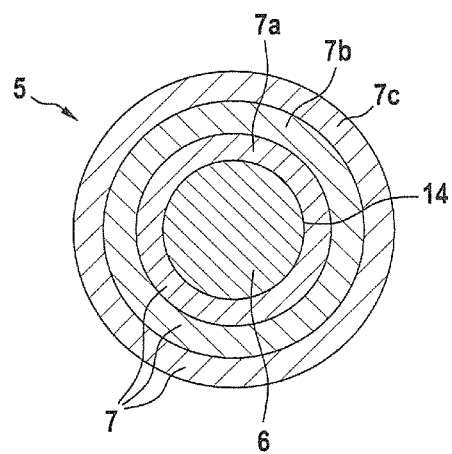
FIG. 5 is a schematic sectional view of a particulate support material coated with graphene-containing material of the stationary slide ring shown in FIG. 2.

Using ceramic particulate support material 6 still has another advantage, which may clearly be seen in FIG. 5: for example, a material bond 14 may easily be formed between the particulate support material 6 and the graphene-containing material 7, through which bond the graphene-containing material 7 is firmly bonded to the surface of the particulate support material 6. In this case, it is especially a sinter bond characterized by high stability, thus increasing abrasion resistance.

Analogously, the above-mentioned explications may as well be applied to the rotating mechanical seal 2, thus increasing the effects achieved by the invention.

Figure 3:
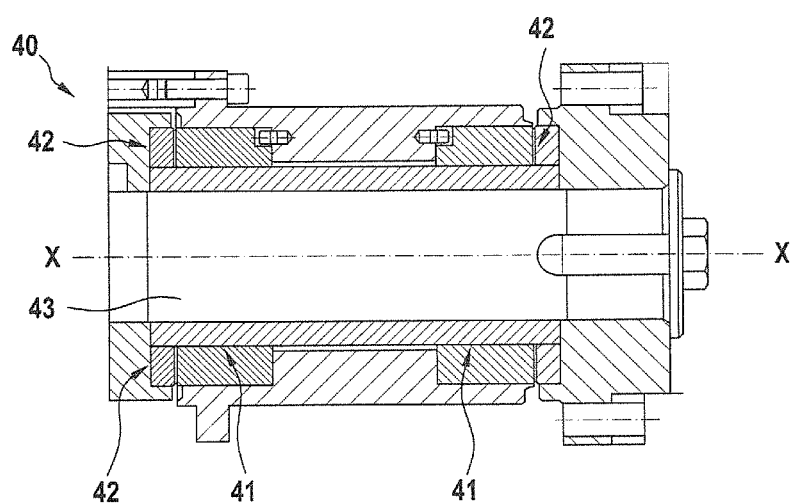
FIG. 3 is a schematic longitudinal view of a bearing arrangement according to a second example embodiment of the invention.
Figure 4:
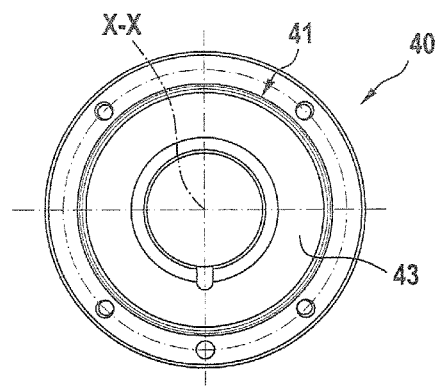
FIG. 4 is a cross-section of the bearing arrangement shown in FIG. 3.

FIG. 3 shows a bearing arrangement 40 in longitudinal section. The bearing arrangement 40 is designed as a slide bearing and comprises two radial slide bearings 41 and one axial slide bearing 42, which support a shaft 43. For the sake of completeness, FIG. 4 shows the same bearing arrangement 40 in cross-section. At least one of the slide bearings 41, 42 shown comprises a sliding surface formed from a sintered material comprising a particulate support material and a graphene-containing material as is disclosed by way of example for the stationary slide ring in FIG. 2. The particulate support material is at least partially surrounded by the graphene-containing material, such that the graphene-containing material at least sectionally surrounds a surface of the particulate support material.

Moreover, as it may be seen from FIG. 5, the graphene-containing material 7, which especially consists of graphene except for technically unavoidable residues, surrounds the particulate support material 6 in the form of individual layers 7a, 7b, 7c, which are arranged on top of each other. The graphene-containing coating may advantageously comprise a coating of up to 100 layers, especially a coating of up to 20 layers and especially a coating of up to twelve layers of graphene-containing material 7. Thus, a content of graphene in the particulate support material 5 coated with graphene-containing material may specifically be controlled, as may the abrasion resistance.

The use of particulate support material 5 coated with graphene-containing material allows for the manufacture of a sliding member, such as a mechanical seal or bearing arrangement, having excellent hardness, high modulus of elasticity and excellent abrasion resistance, while, at the same time, also having excellent tribological properties.

FIG. 6 shows a schematic course of the procedure in the manufacture of particulate support material 5 coated with graphene-containing material, as shown, for example, in FIG. 5. First, in step 100, a particulate support material 6 is dispersed in a dispersant 17. In the embodiment shown herein, SiC is used as a particulate support material 6. An aqueous solution, pure water or an alcoholic solution may advantageously be used as a dispersant 17. Dispersing is performed such that, after dispersion, the particulate support material 6 is distributed in the dispersant 17 in the form of individual particles. Herein use of a stirrer and/or a homogenizer and/or ultrasound may be of advantage.

In step 200, a carbon source 15 is added, specifically a carbonaceous compound advantageously selected from the group consisting of: Furfuryl alcohol, glucose and mixtures thereof, as these carbon sources are formed from renewable feedstock. The carbon source 15 is a precursor of the graphene-containing material to be produced.

Subsequently, in step 300, the dispersant 17 is removed to obtain a solid substance 16, which may very easily be performed, for example, by evaporating the dispersant 17 in a rotary evaporator, freeze-drying and the like. Drying will be continued until the weight of the solid substance 16 remains constant.

Now, the solid substance 16 obtained comprises the particulate support material 6 and the graphene precursor arranged on a surface of the particulate support material 6.

The solid substance 16 may be processed further as it is, but in step 400, is first comminuted and then carbonized. In other words, the carbon source 15 is thermally treated such that the graphene-containing material 7, at least partially, especially completely, covers the particulate support material 6. Carbonization especially is done under an inert gas atmosphere, such as nitrogen. However, other inert gases are also conceivable.

In a first temperature step, the solid substance 16 is heated to 80 to 180° C. at a heating rate of 5° C./min and will be held at that temperature range for 15 to 25 hours, and in a second temperature step, the solid substance 16 is heated to 600 to 1500° C. at a heating rate of 5° C./min and is held at that temperature range for 4 to 8 hours.

A particulate support material 5 coated with graphene-containing material is obtained, wherein the graphene-containing material 7 coats the particulate support material 6 in the form of individual layers, i.e. at least one layer and advantageously up to 100 layers, especially advantageously up to 20 layers and especially advantageously up to 12 layers.

FIG. 7 shows a schematic representation of a method for the manufacture of a sliding member according to an embodiment of the invention, which is exemplified in the form of a slide ring 3. In process step 500, a mixture of a particulate support material 6 and a particulate support material 5 at least partially, especially completely, coated with a graphene-containing material is first produced. The particulate support material 6 especially is a ceramic material, preferably selected from the group consisting of: SiC, WC, $B_4C$, BN, $Si_3N_4$, $Al_2O_3$, MgO, $ZrO_2$ and any mixtures thereof, and especially SiC. Mixing especially may be performed as dry mixing. Subsequently, the resulting mixture is sintered in process step 600. The sintering process produces a slide ring 3 characterized by a pore-free sinter material, thus significantly increasing the density of the slide ring 3 and also increasing the abrasion volume. The slide ring 3 produced in this way is characterized by excellent stability, even under heavy mechanical and/or thermal impacts.

As it is further shown in FIG. 7, the mixture obtained in step 500 above may be applied to a base body 8, the base body 8 also being especially made of a ceramic material, especially selected from the group consisting of: SiC, WC, $B_4C$, BN, $Si_3N_4$, $Al_2O_3$, MgO, $ZrO_2$ and any mixtures thereof, and especially SiC. This allows material costs to be saved while maintaining good quality.

LIST OF REFERENCE NUMBERS 1 mechanical seal arrangement
2 rotating slide ring
3 stationary slide ring
4 sealing gap
5 particulate support material coated with a graphene-containing material
6 particulate support material
7 graphene-containing material
8 base body
9 driving member
10 rotating component
11 housing
12, 13 seal rings
14 material bond
15 carbon source
16 solid substance
17 dispersant
20 product area
21 atmosphere area
29 first sliding surface
30 second sliding surface
31 rear surface
40 bearing arrangement
41 radial slide bearing
42 axial slide bearing
43 shaft
X-X axial direction
100-600 process steps

The invention claimed is:

1. A sliding member comprising a first sliding surface, the first sliding surface comprising a particulate support material and a graphene-containing material, the particulate support material being at least partially coated with the graphene-containing material, and a material bond being present between the particulate support material and the graphene-containing material, wherein the first sliding surface has 6 to 8% by volume of macropores in relation to the total volume of the first sliding surface.

2. The sliding member according to claim 1, wherein the particulate support material is completely coated with the graphene-containing material.

3. The sliding member according to claim 2, further comprising a first base body associated with the first siding surface, said first base body consisting of said particulate support material.

4. The sliding member according to claim 1, wherein the first sliding surface consists of a mixture of particulate support material and particulate support material coated with graphene-containing material.

5. The sliding member according to claim 4, wherein a mass ratio of particulate support material and particulate support material coated with graphene-containing material is 80:20 to 99.5:0.5.

6. The sliding member according to claim 1, wherein the particulate support material consists of a ceramic material selected from the group consisting of: SiC, WC, $B_4C$, BN, $Si_3N_4$, $Al_2O_3$, MgO, $ZrO_2$ and mixtures thereof.

7. The sliding member according to claim 1, the graphene-containing sheathing comprising a coating of up to 100 layers of graphene-containing material.

8. A mechanical seal comprising: a rotating first slide ring having a first sliding surface and a stationary second slide ring having a second sliding surface defining a sealing gap therebetween, the first slide ring and/or the second slide ring being a sliding member according to claim 1.

9. A bearing arrangement comprising at least one sliding member according to claim 1.

10. The sliding member according to claim 4, wherein a mass ratio of particulate support material and particulate support material coated with graphene-containing material is 90:10 to 99.5:0.5.

11. The sliding member according to claim 1, wherein the graphene-containing sheathing comprises a coating of up to 20 layers of graphene-containing material.

12. The sliding member according to claim 1, wherein the graphene-containing sheathing comprises a coating of up to 12 layers of graphene-containing material.

13. The bearing arrangement according to claim 9, wherein the bearing is selected from the group consisting of: a slide bearing, a roller bearing, a radial slide bearing and an axial slide bearing.

* * * * *